United States Patent [19]

Augustinowicz

[11] Patent Number: 5,459,380

[45] Date of Patent: Oct. 17, 1995

[54] MOISTURE ACTIVATED WINDOW CLOSER

[76] Inventor: Walter P. Augustinowicz, 11857 Xavier Ave., Port Charlotte, Fla. 33981

[21] Appl. No.: 254,242

[22] Filed: Jun. 2, 1994

[51] Int. Cl.⁶ ..................................... E05F 15/20
[52] U.S. Cl. ........................ 318/483; 318/283; 318/444; 318/447
[58] Field of Search ............. 318/483, 443–447, 318/452, 280, 281, 283, 643; 340/540, 601–602

[56] References Cited

U.S. PATENT DOCUMENTS 4,908,554  3/1990  Chance ................................. 318/483
5,159,247  10/1992 Resch .................................. 318/483
5,293,105  3/1994  West .................................... 318/483
5,321,345  6/1994  Lambros et al. ..................... 318/483

*Primary Examiner*—David S. Martin

[57] ABSTRACT

A moisture-responsive system for closing the windows or sunroof of a vehicle having one or more openings each closed by a power driven closure; the system having a moisture sensor for providing a moisture signal in response to the sensing of moisture; a circuit coupled to the closure and the moisture sensor for providing a signal to actuate the closure in response to the receipt of a moisture signal, the circuit including disabling features for safety purposes.

9 Claims, 1 Drawing Sheet

MOISTURE ACTIVATED WINDOW CLOSER

BACKGROUND—FIELD OF INVENTION

This invention relates to automatic moisture-responsive systems for closing external openings of motor vehicles, such as windows and sunroofs, and in particular, to a user-installable system incorporating means to temporarily disable the device for safety.

BACKGROUND—DESCRIPTION OF PRIOR ART

Previous attempts have been made to design an automatic moisture-responsive system to close openings of motor vehicles. None of these current systems can be easily installed by the vehicle's owner. In addition, current retrofitting of existing vehicles requires a great amount of effort and consequently considerable additional cost. Furthermore, none of the current systems has a child-proof disabling feature.

One such system typical of the prior art is disclosed in U.S. Pat. No. 4,908,554. In this system, a signal from an external moisture sensor activates an electronic circuit which tries to close open windows. This system senses which windows are open or closed by switches that are installed in each of the openings. It then closes the open windows and, if any fails to close, it will try again. Having to monitor each of the openings adds cost to this system, as well as making it extremely difficult for the average person to install due to the complex wiring needed to monitor switches in all doors. To install these sensor switches in the precise locations required throughout the vehicle would be enough to overwhelm the average end-user. In addition, this device unlocks the driver's door after closing the openings. This is unwanted by most users due to criminal risk. Essentially, a potential criminal can easily unlock a door by applying moisture to the sensor. Further, this system is only capable of closing two openings atone time because of possible circuit overload.

Another prior art system is disclosed in U.S. Pat. No. 5,159,247. This system may only be used on vehicles that come equipped with a rear window defroster. Otherwise, this system would be virtually impossible for the ends user to install without highly specialized technical equipment, such as a vapor-depositing device. In addition, connecting all the wires to the system's microprocessor would take a trained technician several hours to accomplish.

None of the prior-art systems provide a secure way for disabling the device. This is necessary for safety reasons; for example, when children and pets are left unattended in the vehicle.

OBJECTS AND ADVANTAGES

One object of this invention is to provide a system which is very easy for the end-user to install. It is more easily installed than a car stereo and would take a person with limited electrical experience (i.e., a person who can install an average car stereo) less than one hour to install in his own vehicle. For example, most car radios/stereos require cutting the dash board and mounting brackets, whereas this invention only requires two tools, a wire cutter/crimper and a screwdriver or some other such tool with which to remove the inside driver's door panel.

There are only three steps to installing this device. The first is to make only a few simple wire connections: to the battery, to the ignition switch, and to ground. The second is to splice into one wire for each window the user would like the system to activate. The final step is to mount the moisture sensor onto the vehicle with the clip provided. With this system, there is no drilling, soldering, or cutting of dashboards/vehicle material required. Because vehicles with power windows have controls for all the windows in the driver's door the entire circuitry, with the exception on the sensor, fits neatly into the inside of the driver's door and is held firmly by a tie-wrap.

Another advantage of this invention is that it is extremely cost-effective. It is a small circuit with a minimum number of components. In addition, the components are not specialized. They are standard and are easily obtainable and are each made by a number of different manufacturers. Further, because of the minimum number of components, this device is very reliable, in that there are less parts which can fail. Another reason this system is cost-effective is that it makes use of equipment (wires, motors, switches)that are already in the vehicle before installation of the system. Therefore, the cost and labor of having to buy and install these pre-existing features are eliminated. It should be evident that the present system could be readily installed as an incident of the installation of the basic opening/closing system.

This invention also has a disabling feature. This feature enables the driver to disable the sensing device so that the driver can leave the windows down and keep them down. In this way, if it starts to rain, the windows will not close and thereby possibly injure children or pets that may be in the vicinity of the vehicle. This disabling feature is fool-proof in that the driver needs the ignition key in order to disable the window closer. Likewise, the driver also needs the ignition key to re-enable the moisture-sensing device. It is very simple for the driver to disable the device. The driver need only tap the "window-up" button on the driver's side door within one to two seconds before turning off the ignition. A tone will sound when this is done as a warning to the driver that the disabling feature has been activated. This substantially eliminates the likelihood of the driver disabling the device by accident. Because the disabling feature also employs pre-existing switches (ignition switch and window-up button), the additional cost to the circuit for this feature is minimal.

Another feature of this system is that it will close all the windows in the vehicle simultaneously. This is helpful in that a minimum amount of rain is allowed to enter into the vehicle before the windows close. This characteristic is possible because the system utilizes pre-existing circuitry in the vehicle. Vehicles are designed by their manufacturers in such a way that all the windows can be closed simultaneously (by multiple passengers). This system is designed to complement this pre-existing circuitry and use it to its maximum advantage.

Another object of this invention is that the system is very simple to use. Every time the ignition is switched off the device activates itself. The driver does not need to remember to turn it on while exiting the vehicle. The driver can also very easily disable the device with only one touch of the window-up button. If this is done, the device will automatically reactivate itself when the driver returns to the vehicle and reinserts the ignition key.

An added safety feature is that a tone will sound every time moisture is detected and the windows start to roll up. The tone will continue to sound during the time that the windows are closing, until they are completely shut. This will alert persons who may be in or around the vehicle to be sure limbs are not protruding from openings.

BRIEF DESCRIPTION OF THE DRAWINGS

These and other aspects of the invention will become more apparent to those skilled in the art from the following disclosure and accompanying figures wherein.

DETAILED DESCRIPTION OF THE PREFERRED EMBODIMENT

This invention encompasses a moisture activated window closer wherein a circuit controls the actuation of conventional power driven motor vehicle closures, such as windows, sunroofs or the like, coupled thereto in response to the receipt of a signal from an external moisture sensor coupled to the circuit. More particularly, the circuit may cause the closing of a number of closures in response to the detection of moisture resulting from, for example, rain.

Additionally, the circuit can be disabled with the ignition key to prevent accidental injury to unattended pets and/or children while the operator is away from the vehicle.

Figure 1:
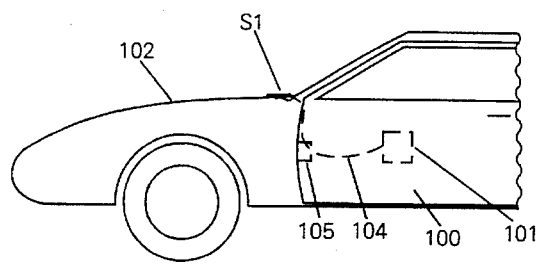
FIG. 1 is a fragmentary side elevational view of the moisture sensor mounted on a vehicle.
Figure 2:
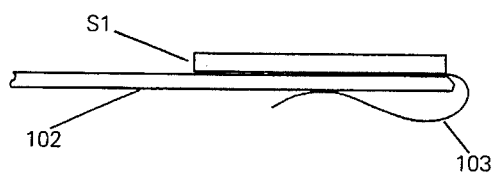
FIG. 2 is an enlarged side elevational view showing the moisture sensor of FIG. 1, and its clip mounted on the hood of a vehicle.
Figure 3:
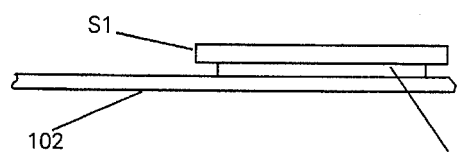
FIG. 3 is an enlarged side elevational view showing the moisture sensor of FIG. 1, and its magnetic mount on the hood of a vehicle.

Referring to FIG. 1, a moisture sensor S1 is mounted on the hood 102 of the vehicle. A control circuit 101 is mounted inside the driver's side door 100 and a two conductor wire 104 is routed by the door hinge 105 to the sensor S1 mounted at the edge of the hood 102 nearest the windshield. As seen in FIG. 2, the moisture sensor S1 is provided with a spring-clip 103 which grips the hood 102 of the vehicle. This clip allows the sensor S1 to be quickly and easily mounted to the vehicle. Alternatively, the spring clip may be replaced by other types of fastening devices, such as a magnet 106 seen in FIG. 3.

Figure 4:
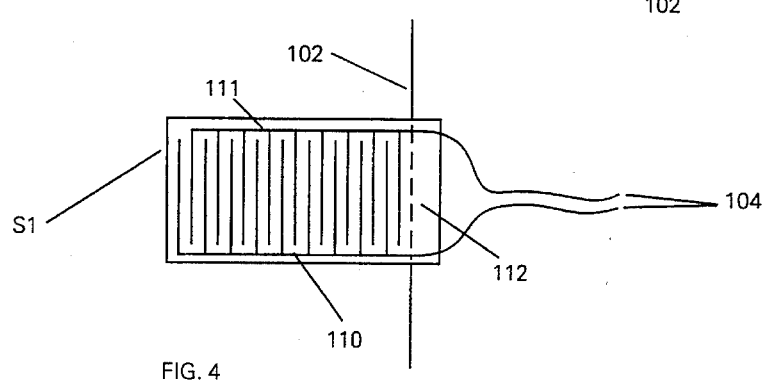
FIG. 4 is a top plan view of the moisture sensor shown in FIG. 2.

As seen in FIG. 4, the sensor S1 is comprised of a first conductive strip 110 and a second conductive strip 111 bonded to an insulating material 112. The conductive strips 110 and 111 are each attached to a separate lead of wire 104. Strips 110 and 111 are oriented relative to each other such that they are close enough that droplets of moisture can bridge the insulating gap between the strips, thereby reducing the resistance between the two conductive strips 110 and 111. The sensor S1 can be constructed simply by etching a PC Board, as is known in the art.

Figure 5:
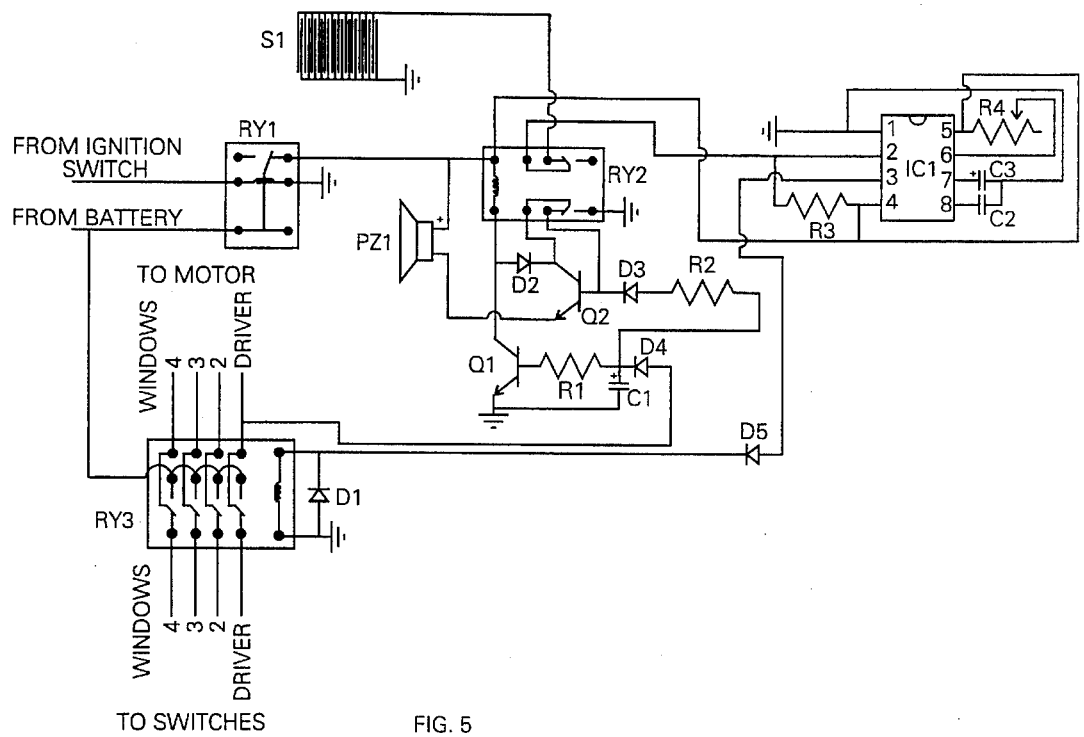
FIG. 5 is a schematic diagram of the circuitry utilized in the present invention.

Referring next to FIG. 5, which is a schematic diagram of the control circuit 101, the control circuit is comprised of five main parts: 1) A relay RY1 to provide power to the circuit only when the ignition key is turned off; 2) a relay RY2 which, when energized, removes sensor S1 from the circuit when the system is disabled or after the sensor has already been activated; 3) a 555 timer IC1 and related components to sense the state of sensor S1 and respond by energizing 4) a relay RY3 for a predetermined period of time, such time being sufficient for the vehicle's windows or other device to close, the relay RY3 sending power to all windows or other closure devices while energized by the 555 timer IC1; and 5) a capacitor/transistor circuit designed to energize the disabling relay RY2 if the driver's side window switch is tapped within several seconds prior to turning off the ignition key switch.

The normally closed position of relay RY1 couples power from the vehicle's battery with the circuit. When the ignition key is turned on, 12 volts is applied to the ignition wire which energizes RY1, removing power from the circuit. This is provided because if the ignition is on, the vehicle is assumed to be occupied, thus making the automatic window closing device not needed, as the driver is available to close the windows.

Relay RY2 is provided to remove sensor S1 from the circuit when energized. This relay prevents the windows from continuing to try to roll up, as long as the sensor is wet, after it has already been activated once. This relay has a double function in that it can also be used to disable the circuit for safety reasons in the non-energized state, RY2 connects one of the sensor S1 leads to the input of the 555 timer IC1. Once energized, the input to IC1 is disconnected from the sensor S1. RY2 is a double pole relay, and the second pole is used to lock RY2 in the energized state until such time as power is removed from the coil of RY2 by turning off the ignition key.

The 555 timer IC1 is connected as a one-shot timer. The input of IC1 is tied to 12 volts by a 220K ohm resistor R3. IC1 is also connected to one side of the sensor S1. The other side of S1 is connected to ground. This sets up a voltage divider circuit that remains at 12 volts as long as sensor S1 is open. As moisture collects on the sensor, the resistance across the conductive strips 110 and 111 drops. When this resistance drops below 100 K ohms, the voltage at the input will be low enough to trigger the timer IC1. At this point, the output of IC1 will go high for a predetermined period of time established by capacitor C3 and potentiometer R4. (This will provide sufficient time for the vehicle's windows or other devices to close). This high output will energize relay RY3.

Although in this diagram relay RY3 is shown as a four pole relay, any number of poles may be employed to close any corresponding number of windows or other closures. During Installation of the control circuit 101, each wire which provides "up" power to its respective window motor is cut and connected across the normally closed contacts of the relay RY3. Until energized, RY3 maintains normal connections between window switches and their respective motors. Once RY3 is energized by a high output from timer IC1, battery power is coupled to all conventional window close actuators (not shown) until timer IC1 output goes low. Diodes D1 and D5 are provided to absorb voltage generated by the relay coil when the relay is switched off.

The driver's window output of RY3 is connected to a capacitor C1 through a diode D4. When the driver's side window receives power either by tapping the up switch before turning off the ignition or by the energizing of RY3, C1 becomes charged. D4 prevents C1 from discharging back through the window motor (not shown). C1 slowly discharges through a resistor R1 and a transistor Q1. As C1 is discharging, Q1's is collector is shorted to ground which energizes relay RY2 if the ignition key is in the of position, thus disabling the circuit. Once RY2 is energized, and C1 still has a charge, a transistor Q2 is collector is shorted to ground. This sends power through a piezzo buzzer PZ1 which emits a tone that continues until such time as C1 is fully discharged.

Conclusion, Ramifications, and Scope of Invention

Thus it will be seen that the moisture activated window closer of the present invention provides a highly reliable, inexpensive, and easy to .install system while providing a comforting safety feature.

While the above description contains exemplary circuitry and components, these should not be construed as limitations on the scope of the invention, but rather as an exemplification of the preferred embodiment thereof. Many other variations are possible. For example, this system may be employed to close other motorized closures, such as sunroofs, convertible roofs, or skylights (in Recreational Vehicles). Accordingly, the scope of the invention should be determined not by the embodiment illustrated, but by the appended claims and their legal equivalents.

I claim:

1. In a vehicle having an ignition system including a source of power controlled by an ignition switch, a motor driven closure for an opening in the vehicle, and switch means connecting the source of power to the motor driven closure to selectively open and close the closure relative to its opening;

a moisture responsive circuit for closing the opening, said circuit comprising:

a moisture sensor mounted on the vehicle in a position to be contacted by moisture;

control means operatively connected to the vehicle's ignition system to provide power to said moisture responsive circuit only when the vehicle's ignition system is deactivated;

actuating means connected to the switch means for the motor driven closure to close the opening;

timing means operatively connected to said sensor and to said actuating means to energize said actuating means for a predetermined length of time in response to a moisture initiated signal from said sensor; and disenabling means for deactivating said circuit, said disenabling means being connected to said timing means so as to deactivate said circuit subsequent to actuation of said actuating means for said predetermined length of time, whereby to discontinue power to the motor driven closure upon closure of the opening, said disenabling means also being connected to the switch means connecting the source of power to the motor driven closure, whereby actuation of said switch means immediately prior to turning off the ignition switch acts to energize said disenabling means to deactivate said circuit, said circuit remaining disabled until the ignition switch is turned on.

2. The moisture responsive circuit claimed in claim 1 wherein said control means comprises a normally closed relay adapted, when closed, to power said circuit and, when opened, to disconnect said circuit from the source of power.

3. The moisture responsive circuit claimed in claim 1 wherein said actuating means comprises a relay which, when energized by said timing means, provides power to the motor driven closure.

4. The moisture responsive circuit claimed in claim 1 wherein said disenabling means comprises a double pole relay wherein one of said poles is adapted to lock said relay in the energized state until the ignition system is turned on, and other of said poles acting, when energized, to disconnect said sensor from said timer means.

5. The moisture responsive circuit claimed in claim 1 wherein the vehicle has a plurality of motor driven closures each controlled by its own switch means, and wherein said actuating means is adapted to be operatively connected to the switch means for each of the motor driven closures, whereby to simultaneously close all open closures when the said circuit is activated.

6. The moisture responsive circuit claimed in claim 1 wherein said sensor includes means for detachably securing said sensor to a vehicle.

7. The moisture responsive circuit claimed in claim 6 wherein the means for detachably securing said sensor to the vehicle comprises a spring clip.

8. The moisture responsive circuit claimed in claim 6 wherein the means for detachably securing said sensor to the vehicle comprises a magnetic means.

9. The moisture responsive circuit claimed in claim 1 including buzzer means adapted to be energized upon actuation of said disenabling means by the switch means connecting the source of power to the motor driven closure.

\* \* \* \* \*